United States Patent

Port et al.

[15] 3,653,848
[45] Apr. 4, 1972

[54] CRYSTALLIZATION PROCESS
[72] Inventors: Eugene B. Port, Solvay; Carlton J. Howard, Salina, both of N.Y.
[73] Assignee: Allied Chemical Corporation, New York, N.Y.
[22] Filed: Sept. 4, 1968
[21] Appl. No.: 757,511

[52] U.S. Cl. .................................. 23/302, 23/63
[51] Int. Cl. .................................. C01d 7/00, C01d 11/00
[58] Field of Search .................................. 23/63, 302; 159/45

[56] References Cited

UNITED STATES PATENTS

| | | | |
|---|---|---|---|
| 2,792,282 | 5/1957 | Pike | 23/302 |
| 2,962,348 | 11/1960 | Seglin | 23/63 |
| 3,264,057 | 8/1966 | Miller | 23/63 |
| 2,330,221 | 9/1943 | Kermer | 159/45 |
| 3,273,959 | 9/1966 | Miller | 23/63 |

Primary Examiner—Norman Yudkoff
Assistant Examiner—S. Silverberg
Attorney—Gerard P. Rooney

[57] ABSTRACT

Invention relates to the preparation of sodium carbonate precursor crystals, such as sodium bicarbonate, sodium sesquicarbonate, anhydrous sodium carbonate and sodium carbonate monohydrate by a crystallization process which involves forming a first crop of said precursor crystals from a substantially saturated carbonate process solution and subjecting the mother liquor separated from the first crop of precursor crystals to crystallization, including a crystallization temperature higher than that employed to obtain the first crop of said precursor crystals, to effect formation of a second crop of precursor crystals.

15 Claims, 4 Drawing Figures

SAMPLE A
RUN 1    60 °C
$Na_2CO_3 \cdot H_2O$
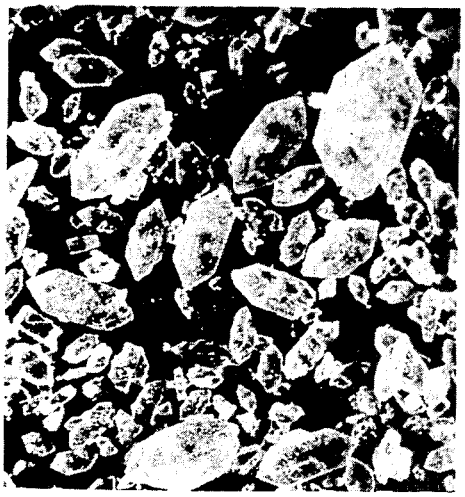
SAMPLE A
RUN 2    60 °C
$Na_2CO_3 \cdot H_2O$
SAMPLE A
RUN 3    60 °C
$Na_2CO_3 \cdot H_2O$
FIG. 3

SAMPLE D
RUN 1    60 °C
$Na_2CO_3 \cdot H_2O$
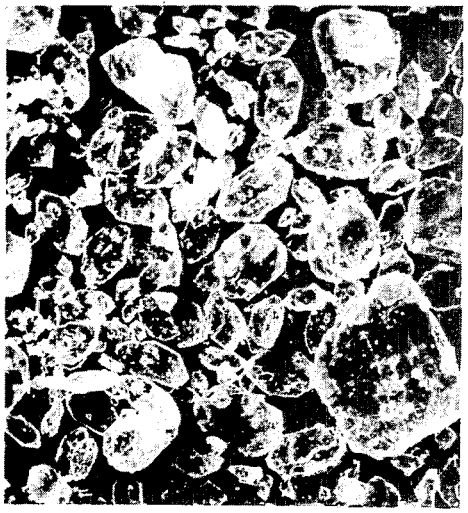
SAMPLE D
RUN 2    95 °C
$Na_2CO_3 \cdot H_2O$
FIG. 4
INVENTORS
EUGENE B. PORT
CARLTON J. HOWARD
ATTORNEY

CRYSTALLIZATION PROCESS

Trona, as found in the Green River area of Wyoming consists mainly of sodium sesquicarbonate ($Na_2CO_3 \cdot NaHCO_3 \cdot 2H_2O$). A typical analysis of trona contains:

| Constitutent | Percent |
|---|---|
| $Na_2CO_3$ | 45 |
| $NaHCO_3$ | 36 |
| $H_2O$ | 15.30 |
| $NaCl$ | 0.04 |
| $Na_2SO_4$ | 0.01 |
| $Fe_2O_3$ | 0.14 |
| Organic Matter | 0.30 |
| Insolubles | 3.20 |

In addition to a water-insoluble fraction resulting from the association of the trona with shale stringers or beds in the trona deposits, organic matter in the order of about 0.3 percent is present which would contaminate the desired product, e.g., sodium carbonate precursor crystals, unless it is removed. It is believed that the organic matter in the trona consists of kerogenaceous material containing monocarboxylic acids, dicarboxylic acids, certain unsaturated acids, steroids and certain rosin acids. Furthermore, in order to improve the desired physical properties of the sodium carbonate precursor crystals, it is customary to add to the solution to be crystallized organic surface active agents, such as alkylated benzene sulfonate, as crystallization modifiers to improve crystallization. Likewise, organic defoaming agents and other organic impurities picked up in the circulating liquors in the plant are present in the solution prior to and during crystallization. The presence of these organics to any appreciable extent is not desired because they adversely affect crystal quality, e.g., discoloration of the crystals and reduction in bulk density, which may limit the extent of use of the precursor crystals, particularly if they are to be converted to dense soda ash for use in the glass industry.

Various methods previously have been proposed to reduce the organics to an acceptable level so as not to adversely affect the crystal quality. For instance, in U.S. Pat. Nos. 2,962,348 and 3,131,996 the crude trona is decarbonized at relatively high temperatures. These patents disclose that at temperatures in the order of about 400° to about 800° C., the organic matter present in the crude trona is substantially removed as it is converted to a less soluble state where it is removed in the subsequent steps of dissolving, clarifying and filtration prior to crystallization. This method, of course, would involve a high heat requirement, thus increasing the cost of the ultimate product. Also, heating the trona in excess of 400° C., while eliminating substantial amounts of the carbon in the crude trona, substantially increases the quantity of water-soluble silica in the crude sodium carbonate, the removal of which is difficult, requiring the bleeding off of substantial amounts of the mother liquor separated from crystallizers. This results in a loss of valuable carbonate values in the discarded mother liquor.

Another method proposed is that described in U.S. Pat. No. 3,028,215, wherein the sodium carbonate precursor crystals containing organic impurities are subjected to a high temperature calcination, i.e., temperatures in the order of about 400° C. to about 800° C., wherein the organic impurities are either volatilized or converted to a coke which allegedly does not present any problem in the utilization of the resulting soda ash in commerce. However, the crystal quality is not significantly improved because the organics are present during crystallization at which time their adverse effect is realized on the quality of the crystal produced during the crystallization. Also, the equipment and heat requirements to calcine the contaminated sodium carbonate precursor crystals are significant, particularly when the production rate is in the magnitude of more than 1,000 tons of product per day.

Still another method for reducing organics is that described in U.S. Pat. No. 3,260,567, wherein the crude trona is first converted to crude sodium carbonate at relatively low temperatures, i.e., in the order of about 150°to 200° C., and then the crude sodium carbonate is dissolved in an aqueous solution. After removal of the insolubles by clarification, the organics are substantially reduced by passing the solution of crude sodium carbonate through a bed of adsorbent, such as activated carbon, prior to crystallization. After crystallization the mother liquors are recycled through the adsorbent beds to reduce the buildup of the organics in the mother liquor stream prior to a second crystallization. While there is little, if any, necessity to bleed off any mother liquor due to organics building up in the recycled mother liquor, special equipment is necessary to reactivate the large amounts of the activated carbon when it no longer effectively performs its function. Also, there is needed to effect this operation an increase in the necessary processing equipment due to the large volumes of liquid, i.e., fresh feed solution as well as recycled mother liquor, to be handled. It is estimated that to handle this recycled mother liquor the number of carbon towers would be in the order of approximately twice that needed to handle the increased volume.

Notwithstanding these elaborate processing techniques which all involve a substantial cost in capital equipment and consumption of time, the effectiveness of the removal of organic matter is reduced, particularly when the trona ore quality is poor or processing upsets occur, when the carbonate process solution has objectionable and non-adsorbable organic impurities and resort must be made to the use of the aforementioned organic-containing crystal modifiers. Additionally, after a first crop of sodium carbonate precursor crystals is obtained, the separated mother liquor contains concentrated amounts of the organics and after the production of each succeeding crop of precursor crystals obtained in a continuous operation of a trona processing plant, the organics build up and adversely affect the crystal quality of the sodium carbonate precursor crystals.

It has now been found that the prior art problem concerning the presence of organic impurities in a carbonate process solution has been substantially obviated by the discovery that the crystal quality of sodium carbonate precursor crystals is affected adversely more at lower crystallization temperatures than at the higher temperatures. In practice, the present invention comprises the formation of a first crop of sodium carbonate precursor crystals from a carbonate process solution, separating these crystals from mother liquor and subjecting the mother liquor to crystallization conditions including temperatures higher than those employed to obtain the first crop of precursor crystals to effect crystallization of a second crop of precursor crystals. By the phrase "carbonate process solution" is meant a substantially saturated aqueous solution from which the sodium carbonate precursor crystals, i.e., sodium bicarbonate, sodium sesquicarbonate, anhydrous sodium carbonate and sodium carbonate monohydrate, may be crystallized as the stable crystal phase and recovered from mother liquor. The crystallization procedure of the present invention is also applicable to sodium carbonate-sodium bicarbonate process solutions derived from other natural minerals such as nahcolite ($NaHCO_3$), thermonatrite ($Na_2CO_3 \cdot H_2O$), natron ($Na_2CO_3 \cdot _2O$), and dawsonite ($NaAlCO_3(OH)_2$), particularly when these minerals are associated with or near kerogen type deposits. The carbonate process solutions derived from these minerals, including trona, contain varying proportions of sodium carbonate and sodium bicarbonate together with soluble organic impurities. The "carbonate process solution" may be prepared, as described hereinbelow, by various procedures and contains about 10 to 1,000, preferably about 10 to 500 parts per million organic carbon, basis sodium carbonate.

FIGS. 3 and 4 are photographs (magnification 20X) of sodium carbonate precursor crystals prepared by different crystallization techniques.

Figure 1:
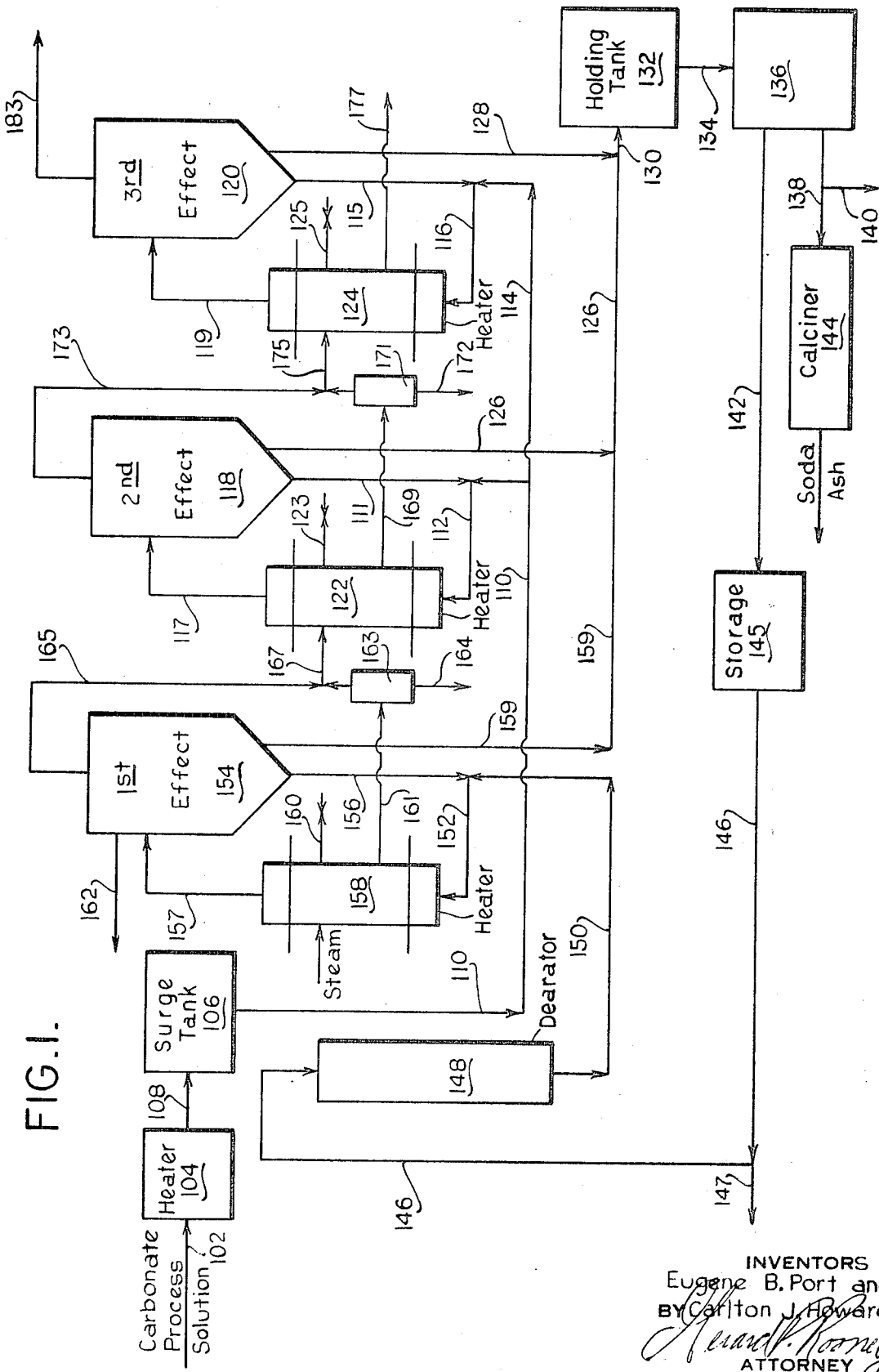
FIG. 1 is a schematic of the crystallization technique of the present invention.

In a typical trona processing operation a carbonate process solution which has been clarified and filtered is passed in series through crystallization units, typically "multiple effect" evaporator crystallizers. In general, three crystallizers or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The "effects" are numbered in the direction of steam flow. As the carbonate process solution passes through the crystallizers a slurry of sodium carbonate precursor crystals is formed and passed to each succeeding crystallizer. The slurry is passed from one effect to the other in the chosen direction by a series of pumps. From the last effect the slurry, containing about 15 to 60 percent, preferably about 30 to 50 percent, solids is allowed to settle. The sodium carbonate precursor crystals are separated and the mother liquor separated from the sodium carbonate precursor crystals is combined with the freshly filtered carbonate process solution which is to be fed to the crystallizers to effect crystallization of a second crop of precursor crystals.

Exemplary of the aforementioned prior art crystallization procedures for the processing of trona solutions may be found in the disclosures of U.S. Pat. Nos. 2,704,239 (crystallization of sodium bicarbonate); 2,770,524 (crystallization of anhydrous sodium carbonate); 2,639,217 and 3,028,215 (crystallization of sodium sesquicarbonate); and 2,343,080, 2,343,081, 2,962,348, 3,131,996 and 3,260,567 (crystallization of sodium carbonate monohydrate). In each one of these prior art processes, the carbonate process solution generally first enters the crystallizer operated at highest temperature (first effect) and passes in series in the form of a slurry through the crystallizers, each succeeding one being operated at a lower temperature than the previous one. In the vent the solids content of the slurry which is being pumped through the crystallization unit becomes too thick or viscous a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted to soda ash. The mother liquor is then recycled to the system passing through the first effect evaporator crystallizer together with clarified and filtered trona process solution not previously treated in the crystallizer. In some processes a portion of the mother liquor is sent to dissolve additional trona.

However, in the present invention the carbonate process solution which has been clarified and filtered, is first fed for crystallization to the crystallizer(s) operated at the lower temperatures, e.g., the second and third effects of a multiple effect evaporator system, and the mother liquor separated from the sodium carbonate precursor crystals is then used as a feed liquor to the crystallizer(s) operated at the highest temperature, e.g., first effect. Thus, for any level of organic impurity in the crystallizer feed liquor, whether carbonate process solution or recycled mother liquor, crystal quality has been found best from the crystallizer operated at the highest crystallizing temperature. Thus, the adverse effect on the sodium carbonate precursor crystal quality prepared from the feed containing the higher organic content, i.e., recycled mother liquor, would be minimized.

The carbonate process solution may be subjected to crystallization in any of the well known types of evaporative crystallizers commonly employed. Preferably, however, for purposes of economy, it is preferred in the operation of the present invention to employ as the crystallization system three evaporative crystallizers. However, it is possible to practice the present invention employing a greater or lesser number of crystallizers, the choice being one of economy.

Reference is now made to FIG. 1, which represents a flow diagram of one form of a crystallization system of the present invention for crystallizing sodium carbonate precursor crystals from carbonate process solution. Initially it is observed from FIG. 1 that the carbonate process solution is first fed in parallel to the second and third effect crystallizers.

A substantially saturated carbonate process solution which will crystallize the desired precursor crystals as the stable crystal phase under the crystallization conditions chosen passes via line 102 through a crystallizer feed preheater 104 to crystallizer feed storage or surge tank 106 by line 108. From the crystallizer feed storage tank 106 the trona process solution is pumped to the second and third effect crystallizers 118 and 120, respectively, in parallel feed. Preferably, each of these effects 118 and 120 provides for a separate recirculation of carbonate process solution through the effects by withdrawing a slurry of the sodium carbonate precursor crystals via lines 111 and 115, respectively, from the bottom of each effect and pumping it back into the main bodies of these effects after combining it with the trona process solution from the feed tank 106 by lines 110 and 112 and by lines 110, 114 and 116, respectively. The combined streams to each of the effects passes through heat exchangers 122 and 124, respectively, wherein each feed is heated indirectly with the condensing vapors from the preceding higher temperature crystallizer to bring the carbonate process solution to the desired crystallization temperature range.

The amount of recirculation in each effect may be controlled within limits, which in turn controls the so-called "flash range" of the crystallizers. The flash range is the difference in temperature between that prevailing in the crystallizer and that of the recirculating feed to the crystallizer. For instance, if the desired sodium carbonate precursor crystal is sodium carbonate monohydrate, the carbonate process solution entering the first effect is heated by saturated steam having a temperature of about 116° C. so that the recycled mother liquor separated from the precursor crystals is heated by the steam having a temperature of about 116° C. when it enters the first effect crystallizer 154. The temperature of the crystal slurry removed from this effect via line 159 is from about 105° to 109° C. This latter temperature is therefore that prevailing in the first effect. The condensate exiting via line 161 from the heat exchanger 158 is passed to flash tank 163. The steam from this flash tank is combined with the vapor from the first effect evaporator via line 165, and this combined vapor stream, at a temperature of about 99° C., enters heat exchanger 122 via line 167. The crystal slurry which leaves the second effect is at a temperature of about 88° to 96° C. Likewise, the condensate leaving heat exchanger 122 via line 169 is passed to second effect flash tank 171, and the steam from this flash tank, combined with the vapor leaving the second effect via line 173 enter heat exchanger 124 via line 175. This combined vapor stream is used to heat the carbonate process solution fed to the third effect crystallizer 120. The feed to this effect is heated to about 82° C. and the crystal slurry leaving this effect preferably is at a temperature of about 71° to 79° C. Thus, the preferred flash range in each of these effects is about 3° to 11° C.

The carbonate process solution, after being heated in the heat exchangers 122 and 124, is passed to the crystallizers 118 and 120, via lines 117 and 119, respectively. Crystallization is effected under conditions to form the desired sodium carbonate precursor crystal in the form of a slurry. The crystal slurry from the second and third effects 118 and 120 is drawn off via lines 126 and 128 and passed to an agitated slurry holding tank 132 by line 130. Desirably, the slurry contains approximately 40 percent solids in a crystal slurry draw. The slurry is passed from the holding tank 132 via line 134 to separator 136, wherein the sodium carbonate precursor crystals are separated from the mother liquor. The precursor crystals are removed from separator 136 via line 138 and may be either removed via line 140 and dried and stored for future use or converted to soda ash in calciner 144.

The mother liquor solution removed from separator 136, substantially saturated with the desired sodium carbonate precursor crystal and having a higher concentration of impurities than the carbonate process solution fed to the second and third effect crystallizers, is passed via line 142 to mother liquor storage tank 145. The mother liquor is pumped from the storage tank 145 and passed to mother liquor deaerator 148 via line 146. A portion of the mother liquor may be recycled to the dissolving unit via line 147, as will be discussed below concerning the use of the present crystallization system in combination with the various trona processes described in the prior art. The mother liquor from the mother liquor deaerator 148 is pumped via lines 150 and 152 through heat exchanger 158 to first effect crystallizer 154 via line 157. Recirculating is carried out in the first effect crystallizer by recirculating a portion of the slurry from crystallizer 154 via lines 156 and 152 through heat exchanger 158. The slurry of sodium carbonate precursor crystals is removed from crystallizer 154 by line 159 and combined with the slurry streams removed from the second and third effect crystallizers 118 and 120. The combined streams of sodium carbonate precursor crystal slurry containing about 25 percent to about 45 percent solids is passed via line 130 to slurry tank 132 and treated as above to separate the crystals from the mother liquor.

Since the mother liquor separated from the sodium carbonate precursor crystals will contain concentrated amounts of impurities which will build up after a number of recycles, the first effect crystallizer 154 is provided with means for purging a portion of the recycled mother liquor from the system and passing this to waste via line 162. This may be accomplished by monitoring the impurities level in the recycled mother liquor so that it does not exceed an organic carbon level of about 300 to 5000 parts per million, preferably about 300 to 3,000 parts per million, basis sodium carbonate. When it is necessary due to an unsatisfactory concentration of impurities in the recycled mother liquor to the first effect, purge of mother liquor from the first effect evaporator in an amount equivalent to about 1 to about 10 percent, preferably 3 to about 5 percent of the total sodium carbonate introduced to the process is preferred to reduce the impurities level to a concentration which does not seriously affect crystal quality. Desirably, the sodium carbonate precursor crystals contain 1 to 100, preferably 5 to 60 parts per million organic carbon impurity.

The condensate removed from the flash tanks 163 and 171 via lines 164 and 172, respectively, and from heat interchanger 124, via line 177 depending on its purity and demand, is either returned to the boiler house or sent to a condensate storage for use as make-up water in the process. Vacuum is applied to the system via line 183 and can be provided, for example, by a conventional water cooled condenser and steam ejector combination. The noncondensibles during start-up and operation, are removed by conventional manipulation of the valves on the noncondensed - gas vent lines 160, 123 and 125 from the steam space of the heat exchangers 158, 122 and 124. These lines may be connected to the vapor spaces of the corresponding effects or to the main vacuum line 183.

Instead of the carbonate process solution being fed in parallel to the second and third effects 118 and 120, the carbonate process solution may be fed in series to the system, first to the second effect 118, and the slurry removed therefrom may be fed to the third effect 120. The mother liquor separated from the sodium carbonate precursor crystals formed in the second and third effects is then sent to the first effect 154. Alternatively, the carbonate process solution may be first fed to the third effect 120, the mother liquor separated from the sodium carbonate precursor crystals sent to the second effect 118 to form a second crop of crystals and the mother liquor separated from these crystals sent to the first effect 154 to form a third crop of precursor crystals.

As mentioned above the crystallization procedure of the present invention is applicable to the preparation of precursor crystals of sodium carbonate, i.e., sodium sesquicarbonate, anhydrous sodium carbonate, sodium carbonate monohydrate and sodium bicarbonate, from Wyoming trona in a variety of ways previously proposed. For instance, if the desired precursor crystal is sodium sesquicarbonate, the crude trona is dissolved in an aqueous solution, preferably containing a recycled mother liquor, which solution contains an excess amount of carbonate over bicarbonate. The substantially saturated carbonate process solution containing sodium sesquicarbonate is then clarified and filtered and the filtrate is then passed to a crystallization system, described above, operated under conditions such that sodium sesquicarbonate crystallizes as the stable phase. The sodium sesquicarbonate crystals are separated from the mother liquor and a portion of the mother liquor is recycled to the dissolver to dissolve more crude trona and the other portion is passed to the high temperature crystallizer to form a second crop of sodium sesquicarbonate crystals. The sesquicarbonate crystals may be dried and stored or they may be converted to soda ash, such as by calcination. Typical of the processes describing the preparation of sodium sesquicarbonate from trona which may employ the crystallization technique of the present invention are described in U.S. Pat. Nos. 2,346,140, 2,639,217, 2,798,790 and 3,028,215.

Another known method for the processing of trona in which a carbonate process solution may be subjected to the crystallization procedure of the present invention is the preparation of anhydrous sodium carbonate by maintaining the crystallization temperature in the crystallization units above about 109° C., the transition temperature at which anhydrous sodium carbonate is formed as the stable crystal phase. Typical of this process is the one described in U.S. Pat. No. 2,770,524.

Still another method in which the crystallization procedure of the present invention for the processing of trona process solution may be employed is in the preparation of sodium bicarbonate from crude trona which comprises dissolving the crude trona in an aqueous solution, preferably heated, containing sodium carbonate and sodium bicarbonate values, preferably a hot recycle mother liquor stream containing sodium bicarbonate and sodium carbonate values in which the bicarbonate content of the solution is greater than the amount originally found in crude trona. This may be accomplished by treating the recycled mother liquor either before or after said dissolution has taken place with carbon dioxide. The solution is clarified and filtered and then subjected to crystallization procedure of the present invention under crystallization conditions such that the sodium bicarbonate in the carbonate process solution crystallizes out as the stable crystal phase. The sodium bicarbonate crystals are separated from the mother liquor and they are either recovered and dried or converted to sodium carbonate, such as by calcination. A portion of the mother liquor, preferably after treatment with carbon dioxide, is recycled to dissolve additional crude trona. The other portion of mother liquor is sent to a higher temperature crystallizer. Typical of this process which may be adapted incorporating the crystallization technique of the present invention is that disclosed in U.S. Pat. No. 2,704,239.

Figure 2:
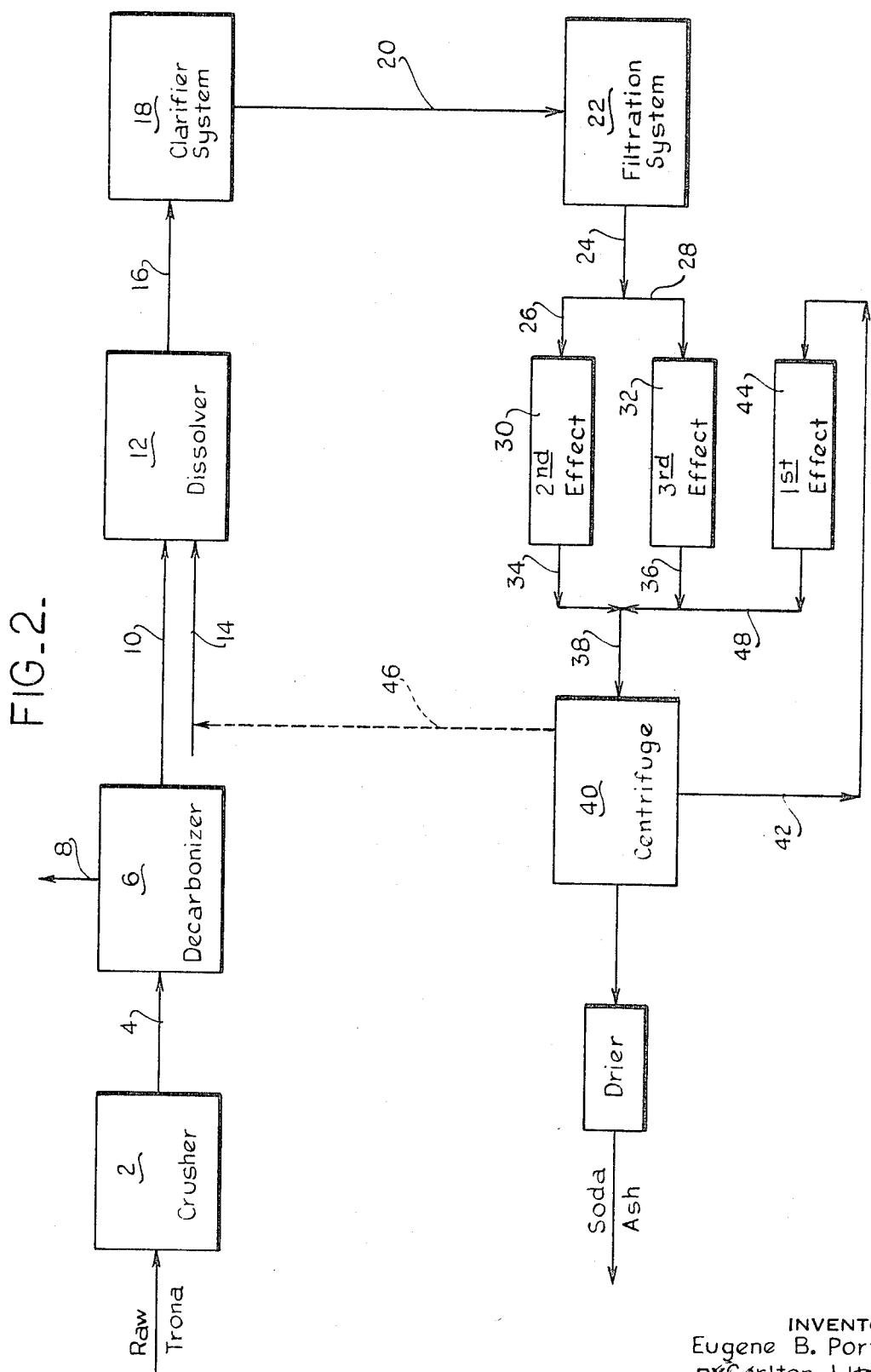
FIG. 2 is a schematic of a typical trona process for preparing sodium carbonate monohydrate crystals by the crystallization technique of the present invention.

A further method in which the crystallization procedure of the present invention may be employed for producing sodium carbonate precursor crystals is the so-called "sodium carbonate monohydrate" method. Reference is made to FIG. 2, which represents a schematic of one form of a monohydrate trona processing operation using the present crystallization technique. Raw trona which has been mined is first crushed in crusher 2. The crude trona is passed via line 4 to decarbonizer 6 wherein the crude trona is heated to convert the trona to crude sodium carbonate by driving off water and carbon dioxide via line 8. This crude product is then passed via line 10 to dissolver 12 wherein the crude sodium carbonate is dissolved in an aqueous solution to prepare a substantially saturated carbonate process solution containing sodium carbonate. Make-up solution which may comprise process water, recycled mother liquor separated from the monohydrate crystals, plant condensate, river or spring water and the like, enters dissolver 12 via line 14. The carbonate process solution is then passed via line 16 to clarifier system 18, and filtration system 22 via line 20. This solution is then passed via lines 24, 26, and 28 to crystallizers comprising second effect evaporator crytallizer 30 and third effect evaporator crystallizer 32 operated in parallel wherein sodium carbonate monohydrate crystals are formed in each of these crystallizers as the stable crystal phase. The sodium carbonate monohydrate slurry from each of these crystallizers is passed via lines 34, 36 and 38 to monohydrate centrifuge 40. The sodium carbonate monohydrate crystals are separated from the mother liquor which may be recycled entirely to the high temperature crystallizer 44, via line 42 or a portion of the mother liquor may be recycled via lines 46 and 14 to the dissolving unit 12.

The slurry from the first effect 44 is combined via line 48 with the slurries from the second effect 30 and third effect 32 and sent to the monohydrate centrifuge 40. The sodium carbonate monohydrate crystals may be dried to remove excess moisture and stored or they may be converted to soda ash by drying to remove the water of hydration. Alternatively, the clarified and filtered carbonate process solution, substantially saturated with sodium carbonate, instead of being passed in parallel to the second and third effect evaporator crystallizers 30 and 32, as shown, may be passed in series first to the second effect evaporator crystallizer 30, and the monohydrate slurry formed therein passed to the third effect crystallizer 32. The combined slurry from these effects is then passed to the monohydrate centrifuge 40, as described above.

Crystallization of sodium carbonate monohydrate can be effected at temperatures ranging from about 36° to 109° C. For best results it has been found in the monohydrate process employing multiple effect evaporators that the first effect evaporator crystallizer 44 be maintained at a temperature between approximately 70° to 109° C., preferably at a temperature of about 85° to 109° C., the second effect evaporator crystallizer maintained at a temperature of approximately 53° to 99° C., preferably at a temperature of 68° to 96° C. and the third effect evaporator crystallizer maintained at a temperature of 36° to 85° C., preferably at a temperature of 50° to 79° C.

whereby the sesquicarbonate is converted to crude sodium carbonate. At temperatures of about 250° C., the required B.t.u. per pound of sodium carbonate formed was approximately 502 and the total residence time per pound of sodium carbonate formed was about 30 minutes to give substantially complete conversion of the sesquicarbonate to crude sodium carbonate.

The crude sodium carbonate was then dissolved in an aqueous solution forming a carbonate process solution containing approximately 28 to 30 percent sodium carbonate. The carbonate process solution containing undissolved grit and mud was passed through a clarification system to remove insoluble solids, such as shale and dirt, and drawn off as thickened mud from the system. Flocculents may be added to the carbonate process solution to assist in coagulation and settling of such solids. The clarified liquor was then filtered through activated carbon in order to reduce those impurities, such as organics, which interfere with the quality of crystals formed during crystallization. The treated sodium carbonate solution was collected after filtration in storage tanks and passed through a polishing filter to remove any entrained carbon in the solution. Each sample was fed to a crystallizer containing seed crystals of sodium carbonate monohydrate having a particle size of about −30 mesh to form a slurry of sodium carbonate monohydrate. The slurry was agitated in the crystallizer to provide a uniform distribution of solids in the slurry.

The crystallizer was brought to the desired crystallization temperature at which point vacuum was applied. A sodium carbonate monohydrate slurry containing approximately 40 percent solids was removed. The crystals of sodium carbonate monohydrate were separated from the mother liquor. The crystals were reslurried with denatured alcohol and filtered. The alcohol washings were discarded and the crystals of monohydrate were allowed to dry at room temperature, after which the crystals were examined microscopically and their physical characteristics, e.g., bulk density and crystal geometry determined. Bulk density and organic carbon content of the product are the measures of product quality used in the evaluation of the monohydrate crystals. Pertinent data on the sodium carbonate monohydrate crystals prepared are presented in Table I, below:

TABLE I

| Sample Number | A | | | B | | C | | D | |
|---|---|---|---|---|---|---|---|---|---|
| Run Number | 1 | 2 | 3 | 1 | 2 | 1 | 2 | 1 | 2 |
| Evaporator temperature, °C | 60 | 60 | 60 | 60 | 95 | 60 | 95 | 60 | 95 |
| Evaporator vacuum, in. Hg | 25 | 25 | 25 | 25 | 9 | 25 | 9 | 25 | 9 |
| Feed liquor feed rate, ml./min | 13 | 13 | 13 | 12 | 10 | 12 | 9 | 13 | 9 |
| Condensate rate, ml./min | 6.6 | 6.7 | 6.7 | 6.1 | 5.1 | 6.1 | 4.6 | 6.7 | 4.3 |
| No. of crystal bed replacements [1] | >50 | [1]19 | 5.5 | 4.3 | 16.3 | 1.9 | 1.6 | 4.8 | 5.2 |
| Monohydrate made, gms./liter/hr.[2] | | | | 190 | | 190 | 187 | 145 | 238 | 180 |
| Bulk density of monohydrate | 1,240 | 1,120 | [1]<1,050 | 1,000 | 1,100–1,150 | <800 | 950–1,000 | 950 | 1,100–1,150 |
| Organic carbon, p.p.m. basis $Na_2CO_3$ in— | | | | | | | | | |
| Feed liquor | 58 | 65 | 135 | 142 | 126 | 2,100 | 2,100 | 303 | 303 |
| Mother liquor | 65 | 135 | 235 | 316 | 375 | 3,260 | 3,820 | 705 | 790 |
| Monohydrate | 51 | 32 | 49 | 48 | 15 | 96 | 13 | 34 | 19 |

[1] Estimated.

NOTES.—1. The starting crystal bed is 520 grams of monohydrate in 800 grams of 30% $Na_2CO_3$ feed solution. The number of crystal bed replacements refers to the number of times the weight of monohydrate crystals equivalent to the starting bed is produced. 2. The production rate is based on the weight of monohydrate from the slurry samples.

C. Exemplary disclosures of the monohydrate process in which the crystallization procedure of the present invention may be applicable may be found in U.S. Pat. Nos. 2,343,080, 2,343,081, 2,962,348, 3,131,996 and 3,260,567.

EXAMPLE

Carbonate process solution comprising a substantially saturated sodium carbonate solution was prepared from trona which had been dry mined and crushed to approximately a minus one-fourth inch size. The crushed, mined, crude trona, containing approximately 85–90 percent sodium sesquicarbonate, was heated at elevated temperatures ranging from about 150° C. to about 500 °C. to effect decarbonization, i.e., drive off carbon dioxide and water, of the crude trona

OBSERVATIONS

In Sample A, the mother liquor separated from the monohydrate crystals from Run No. 1 was used as feed to Run No. 2 and the mother liquor separated from the monohydrate crystals from Run No. 2 was used as feed to Run No. 3. It should be noted that each crystallization was conducted at 60° C. and as the organic impurity was concentrated in each successive run, a total of approximately four times, from the starting liquor of Run 1 to the mother liquor of Run 3, there was obtained a noticeable decrease in crystal quality. This is evident from the photographs (FIG. 3) of the monohydrate crystals and the bulk density values of these monohydrate crystals from each of these runs. These runs show that as the organic impurities in the feed liquor to the crystallizer increase, the product quality of the crystal formed deteriorates.

Runs Nos. 1 and 2 of Sample B were made from the same carbonate process solution, the difference in organic carbon being within the normal variation in the analytical method to determine the carbon. Operating conditions were approximately the same in both runs, except that the temperature of the crystallizer in Run 2 was 95° C. and the vacuum applied was less because of the higher crystallization temperature in Run 2. It may be seen from these data that the crystal quality was better from Run No. 2 as measured by bulk density and organic impurity in the monohydrate product. The crystals from Run No. 1 tended to be more tabular than those from Run No. 2 which contributed to the lower bulk density.

The feed liquor for Runs 1 and 2 of Sample C was mother liquor obtained from a pilot plant crystallization test using carbonate process solution containing sodium carbonate prepared as described above. The organic carbon content was permitted to reach the indicated level, which level is much higher in organic carbon content than normally would be employed without some mitigating treatment, such as purging. While the crystal quality of Run 2 was considered marginally satisfactory, these runs clearly demonstrate that the sodium carbonate monohydrate crystals from the higher temperature crystallizer were better than the crystals from the crystallizer operated at 60° C. on the basis of bulk density and organic impurity.

A comparison of the data of Runs 1 and 2 of Sample D again demonstrates the beneficial effect of the high temperature crystallization technique of the present invention on the crystal quality of the sodium carbonate monohydrate prepared. Crystal quality, both chemical and physical, was better from the crystallizer operated at a temperature of 95° C. than the crystallizer operated at 60° C. The degree of crystal quality improvement is proportional to the amount of temperature increase in the crystallizer. This may be seen from the photographs in FIG. 4, which is magnified 20 times.

We claim:

1. A process for the formation of at least one sodium carbonate precursor crystal selected from the group consisting of sodium bicarbonate, sodium sesquicarbonate, anhydrous sodium carbonate and sodium carbonate monohydrate from a carbonate process solution which consists essentially in subjecting said carbonate process solution containing about 10 to 1,000 parts per million of soluble organic impurities, basis sodium carbonate, to a first crystallization, effecting said first crystallization at a temperature and under crystallization conditions sufficient to effect formation of a stable crystalline phase of said precursor crystals in a mother liquor, subjecting said mother liquor containing a soluble organic impurity level of 300 to 5,000 parts per million, basis sodium carbonate and substantially free of said stable crystalline phase of said precursor crystals produced in said first crystallization, to a second crystallization effected at a temperature higher than the temperature maintained during said first crystallization sufficient to effect formation of a stable crystal phase of said precursor crystals and separating said precursor crystals from mother liquor having an organics level higher than said carbonate process solution and said mother liquor separated from said first crystallization.

2. The process of claim 1, wherein the precursor crystals are sodium sesquicarbonate.

3. The process of claim 1 wherein the precursor crystals are sodium bicarbonate.

4. The process of claim 1 wherein the precursor crystals are sodium carbonate monohydrate.

5. The process of claim 1 wherein the precursor crystals are anhydrous sodium carbonate.

6. The process of claim 4 wherein crystallization of sodium carbonate monohydrate is effected at a temperature within the range of about 36° C. to about 109° C.

7. The process of claim 5 wherein crystallization is effected at a temperature in excess of about 109° C.

8. The process of claim 1 wherein said second crystallization is effected at a temperature from about 5° to 70° C. above the crystallization temperature in the crystallizer to which the carbonate process solution is fed.

9. The process of claim 1 wherein crystallization is effected in a multiple effect crystallization system containing three crystallizers, said first crystallization being effected in the second and third effects of said system and said second crystallization being effected in the first effect of said system.

10. The process of claim 9 wherein said first crystallization is effected at a temperature ranging from about 36° C. to about 99° C. and said second crystallization being effected at a temperature ranging from about 70° to 109° C.

11. The process of claim 9 wherein said first crystallization in the second effect crystallizer is conducted at a temperature ranging from about 53° to 99° C.

12. The process of claim 9 wherein said first crystallization in the third effect crystallizer is conducted at a temperature ranging from about 36° to 85° C.

13. The process of claim 1 wherein said precursor crystals separated from the mother liquor are converted to sodium carbonate.

14. The process of claim 13 wherein said sodium carbonate has a bulk density in excess of about 950 grams per liter.

15. The process of claim 9 wherein the carbonate process solution is fed in parallel to the second and third effect crystallizers.

* * * * *

PO-1050
(5/69)

UNITED STATES PATENT OFFICE
CERTIFICATE OF CORRECTION

Patent No. 3,653,848        Dated April 4, 1972

Inventor(s) Eugene B. Port and Carlton J. Howard

It is certified that error appears in the above-identified patent and that said Letters Patent are hereby corrected as shown below:

Column 2, line 62, "$(Na_2CO_3 \cdot {}_2O)$" should be -- $(Na_2CO_3 \cdot 10\ H_2O)$ --.

Column 3, line 38, "vent" should be -- event --.

Claim 1, column 9, line 48, after "mother liquor" insert -- separating said precursor crystals from said mother liquor --.

Signed and sealed this 26th day of September 1972.

(SEAL)
Attest:

EDWARD M. FLETCHER, JR.
Attesting Officer

ROBERT GOTTSCHALK
Commissioner of Patents